(12) United States Patent
Matsuoka

(10) Patent No.: US 8,419,112 B2
(45) Date of Patent: Apr. 16, 2013

(54) VEHICLE PILLAR GARNISH

(75) Inventor: Ryosuke Matsuoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/119,257

(22) PCT Filed: Oct. 9, 2009

(86) PCT No.: PCT/JP2009/067950
§ 371 (c)(1),
(2), (4) Date: Mar. 16, 2011

(87) PCT Pub. No.: WO2010/044476
PCT Pub. Date: Apr. 22, 2010

(65) Prior Publication Data
US 2011/0163564 A1 Jul. 7, 2011

(30) Foreign Application Priority Data

Oct. 15, 2008 (JP) .................................. 2008-266617
Oct. 15, 2008 (JP) .................................. 2008-266635

(51) Int. Cl.
*B60R 13/02* (2006.01)
(52) U.S. Cl.
USPC ...................... 296/193.06; 296/39.1; 296/1.08
(58) Field of Classification Search ............ 296/187.05, 296/193.06, 39.1, 108, 1.08
See application file for complete search history.

(56) References Cited

U.S. PATENT DOCUMENTS

| | | | | |
|---|---|---|---|---|
| 5,575,500 A | * | 11/1996 | Mimura et al. | 280/751 |
| 5,741,044 A | * | 4/1998 | Kawai et al. | 296/187.05 |
| 5,992,914 A | * | 11/1999 | Gotoh et al. | 296/39.1 |
| 6,095,593 A | * | 8/2000 | Johann et al. | 296/187.05 |
| 6,145,908 A | * | 11/2000 | Deb et al. | 296/39.1 |
| 6,179,359 B1 | * | 1/2001 | Clauson et al. | 296/39.1 |
| 6,302,477 B1 | * | 10/2001 | Satou | 296/187.05 |
| 6,309,011 B1 | * | 10/2001 | Matsuyama et al. | 296/187.05 |
| 6,394,536 B2 | * | 5/2002 | Takahara | 296/187.05 |
| 6,481,776 B2 | * | 11/2002 | Adachi et al. | 296/39.1 |
| 7,717,458 B2 | * | 5/2010 | Tsuge | 280/728.2 |
| 7,722,113 B2 | * | 5/2010 | Kamiya et al. | 296/187.05 |
| 2011/0163564 A1 | * | 7/2011 | Matsuoka | 296/1.08 |

FOREIGN PATENT DOCUMENTS

| | | |
|---|---|---|
| JP | 56-57175 U | 5/1981 |
| JP | 56-116248 U | 9/1981 |
| JP | S61-25246 U | 2/1986 |
| JP | H01-114346 U | 8/1989 |
| JP | 05-65695 U | 8/1993 |
| JP | 08-113160 A | 5/1996 |
| JP | 3279114 B2 | 4/2002 |

\* cited by examiner

*Primary Examiner* — Glenn Dayoan
*Assistant Examiner* — Gregory Blankenship
(74) *Attorney, Agent, or Firm* — Carrier Blackman & Associates, P.C.; Joseph P. Carrier; William D. Blackman

(57) ABSTRACT

Pillar garnish (20) has: a fixation section (52) integrally provided on its rear wall section (51) adjacent to a vehicle occupant's seat (30), the fixation section being mounted to a portion (28) of the pillar (11) facing the occupant's seat; and a swing preventing section (54) provided on a side wall section (53) of the garnish forwardly of the fixation section for preventing the garnish from swinging about the fixation section, the side wall section (53) extending from the rear wall section toward a front wall section of the pillar for covering the inner side surface (11a) of the pillar. The pillar is accommodated in an area (81) between a front edge portion (74) of the side wall section and the lateral outward end (51a) of the rear wall section with a closed-sectional-shape section (22) of the pillar sandwiched therebetween.

10 Claims, 4 Drawing Sheets

VEHICLE PILLAR GARNISH

TECHNICAL FIELD

The present invention relates to an improved vehicle pillar garnish for covering a surface, facing a vehicle compartment, of a pillar of a vehicle to decorate the interior of the vehicle compartment.

BACKGROUND ART

In most automotive vehicles, a front pillar is covered, at its inner surface facing a vehicle compartment, with a pillar garnish. Among the conventionally-known pillar garnishes are ones formed so that a region thereof visible from the eye point (or eye position) of a vehicle occupant seated in a seat of the vehicle has a reduced width to thereby secure a wide field of view of the vehicle occupant. Japanese Patent No. 3279114 discloses an example of such a pillar garnish.

The pillar garnish disclosed in the 3279114 patent is formed in a generally U sectional shape and has its central curved portion mounted, via a mounting bracket, to the inner surface, facing the vehicle compartment, of the front pillar. The mounting bracket has a generally rhomboidal shape, so that a region of the pillar garnish visible from the eye point (eye position) of a vehicle occupant has a reduced width.

However, the pillar garnish disclosed in the No. 3279114 patent, where only the central curved portion is mounted to the front pillar via the mounting bracket, may undesirably swing about the central curved portion. Thus, it is difficult to retain the pillar garnish in a stable manner and appropriately position the pillar garnish relative to other components around the pillar garnish.

Further, in the pillar garnish disclosed in the No. 3279114 patent, the pillar garnish is mounted in such a manner that its edges are located inside flanges of the pillar, and thus, the flanges of the pillar project outwardly of the edges of the pillar garnish. Consequently, the field of view of the vehicle occupant would be undesirably hindered or narrowed.

DISCLOSURE OF THE INVENTION

In view of the foregoing, it is an object of the present invention to provide an improved vehicle pillar garnish which can secure a sufficiently wide field of view of a vehicle occupant and can be retained in place in a stable manner.

In order to accomplish the above-mentioned object, the present invention provides an improved vehicle pillar garnish for mounting on a vehicle pillar to cover a surface of the vehicle pillar facing a vehicle compartment, which comprises: a fixation section provided on a portion of the pillar garnish disposed adjacent to a vehicle occupant's seat, the fixation section being adapted to be mounted to a portion of the pillar facing the vehicle occupant's seat; and a swing preventing section provided forwardly of the fixation section and engageable with a portion of the pillar for preventing the pillar garnish from swinging about the fixation section.

The fixation section of the pillar garnish is mountable to the portion of the pillar facing the vehicle occupant's seat, so that the fixation section can be projected in a direction along the line of sight of the vehicle occupant; thus, in this case, the fixation section need not be projected in a direction intersecting with the line of sight of the vehicle occupant. Thus, the pillar garnish can be formed into a reduced width in a region thereof visible from the eye point of the vehicle occupant seated in the vehicle occupant's seat, so that a widened field of view of the vehicle occupant can be secured. Further, when the pillar garnish is mounted on the pillar with the fixation section mounted to the portion of the pillar facing the vehicle occupant's seat, the swing preventing section prevents the pillar garnish from swinging about the fixation section relative to the pillar. In this way, the pillar garnish can be retained on the pillar in an extremely stable manner and can be readily appropriately positioned relative to other components therearound.

Preferably, the vehicle pillar garnish further comprises: a rear wall section disposed adjacent to the vehicle occupant's seat and having the fixation section integrally provided thereon; and a side wall section extending from the rear wall section toward the front of the vehicle for covering an inner side surface of the pillar, the side wall section having the swing preventing section provided thereon. Thus, the rear wall section and the side wall section can be appropriately supported by the pillar, so that the pillar garnish can be retained on the pillar in an even more stable manner.

Preferably, when the pillar garnish is mounted on the pillar with the fixation section mounted to the portion of the pillar facing the vehicle occupant's seat, the side wall section is disposed in such a manner that a front edge portion thereof is located to overlap the fixation section in the front-rear direction of the vehicle to thereby constitute means for preventing swinging movement of the pillar garnish in conjunction with the swing preventing section. Because the front edge portion of the side wall section and the fixation section can be located to sandwich therebetween the pillar, the pillar garnish can be retained on the pillar even more stably.

Preferably, the pillar is accommodated in an area between the front edge portion of the side wall section and a lateral outward end of the rear wall section with a closed-sectional-shape section of the pillar sandwiched between the front edge portion of the side wall section and the lateral outward end of the rear wall section. In this way, the pillar garnish can hide the pillar from the line of sight of the vehicle occupant, so that a widened field of view of the vehicle occupant can be secured.

Preferably, when the pillar garnish is mounted on the pillar with the fixation section mounted to the portion of the pillar facing the vehicle occupant's seat, the fixation section provided on the rear wall section is projected forwardly from the rear wall section toward the pillar, and an extension line extending in a direction where the fixation section is projected positionally coincides with an end portion, adjacent to the pillar, of a window glass supported by the pillar. Thus, it is possible to eliminate a need for projecting the fixation section inward in the vehicle width direction or in the direction intersecting with the line of sight of the vehicle occupant. As a result, the present invention can secure a sufficiently wide field of view of the vehicle occupant seated in the vehicle occupant's seat.

Preferably, by the fixation section being projected toward the pillar when the pillar garnish is mounted on the pillar, spaces capable of accommodating therein vehicular component parts are defined in both sides, in the vehicle width direction, of the fixation section. Thus, the accommodating spaces can be provided behind the pillar, so that the pillar can be formed into a reduced width so as to secure a sufficiently wide field of view of the vehicle occupant.

Preferably, wherein a front end portion of the side wall section has a greater thickness than a remaining portion of the side wall section. With the front end portion having such a great surface area, a texturing process (i.e., grainy-surface forming process) can be performed as desired on the surface of the front end portion and the remaining portion of the side wall section and on the front edge portion. The front end portion and the front edge portion of the side wall section can be mirrored similarly on the window glass, and a boundary line between the front end portion and the front edge portion of the side wall section can be made less visible.

Preferably, the window glass has a painted section at the end portion adjacent to the pillar, and, when the pillar garnish is mounted on the pillar, the side wall section has a front edge portion located between the lateral inner end, in the vehicle width direction, of the painted section and an exposed-section end of the pillar. Thus, the pillar can be covered with the front edge portion of the side wall section, and the painted section can be provided with its lateral inner end located very close to the edge of the window glass while preventing the pillar from being exposed from between the front edge portion of the side wall section and the painted section. As a result, the field of view of the vehicle occupant seated in the vehicle occupant's seat can be widened up to near the end of the window glass.

BEST MODE FOR CARRYING OUT THE INVENTION

In the following description, the terms "front", "rear", "left", "right", etc. are used to refer to directions as viewed from a human operator or driver of a vehicle.

Figure 1:
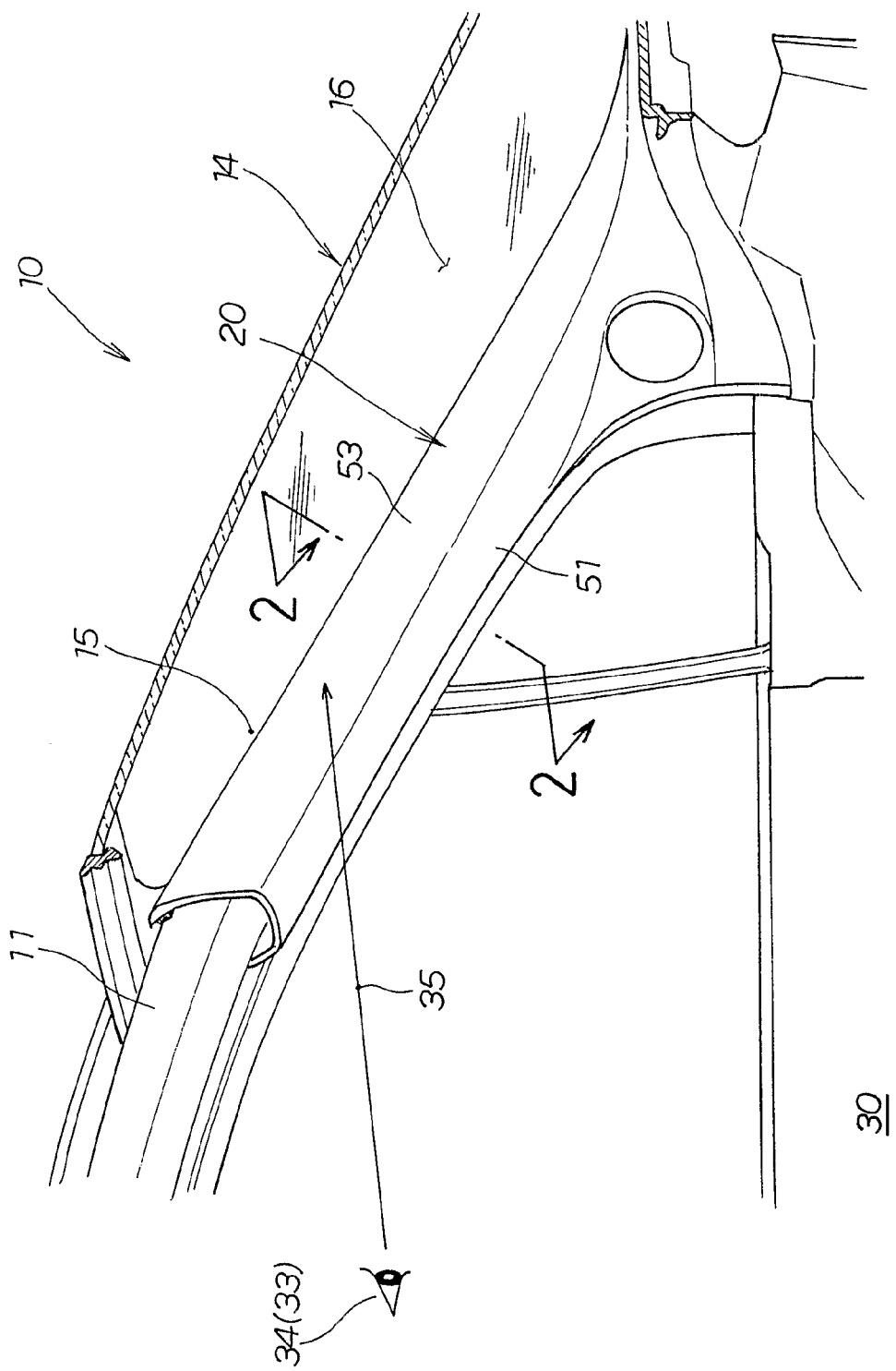
FIG. 1 is a perspective view of a vehicle provided with a vehicle pillar garnish according to an embodiment of the present invention.

FIG. 1 is a perspective view of a vehicle provided with a vehicle pillar garnish according to an embodiment of the present invention. Because a left front pillar 11 and left pillar garnish 20 and a right front pillar 11 and right pillar garnish 20 are provided in symmetrical relation to each other, FIG. 1 shows only the left front pillar 11 and left pillar garnish 20, and the following paragraphs mainly describe the left front pillar 11 and left pillar garnish 20.

In the vehicle 10, the left and right front pillars 11 extend from the left and right sides, respectively, toward the rear of the vehicle body with an up-grade or upward slope. Front window glass 14 is supported and secured at its left and right end portions 15 to front wall sections 12 (see FIG. 2) of the left and right front pillars 11 via dam seals 17 and adhesives 18 (see FIG. 2). Further, the left and right front pillars 11 fixedly supporting the front window glass 14 are covered with the left and right pillar garnishes 20.

Figure 2:
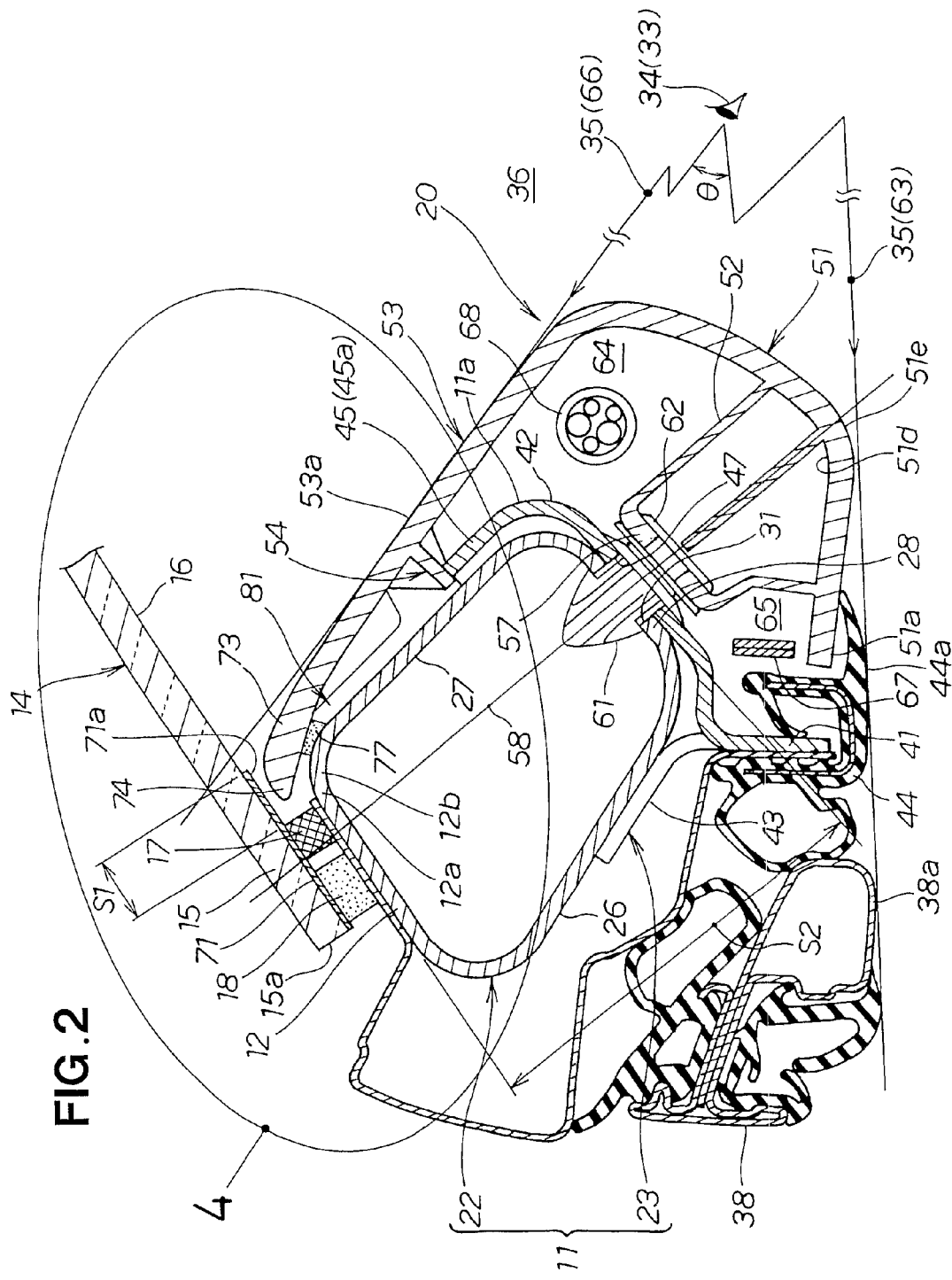
FIG. 2 is a sectional view taken along line 2-2 of FIG. 1.
Figure 3:
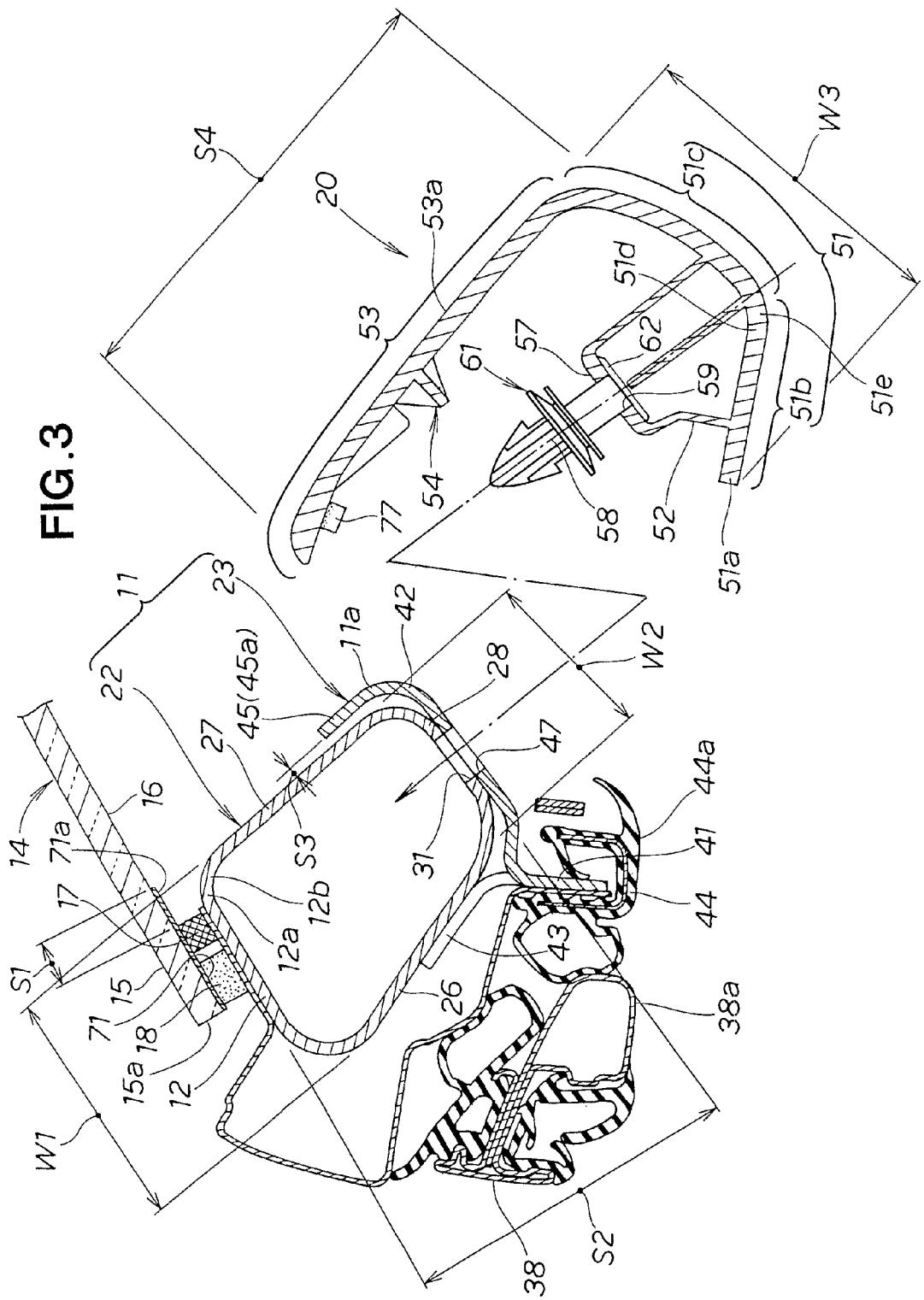
FIG. 3 is a sectional view of the pillar garnish disassembled from a front pillar.

FIG. 2 is a sectional view taken along line 2-2 of FIG. 1, and FIG. 3 is a sectional view showing the pillar garnish 20 as detached from the front pillar 11. The front pillar 11 includes a pillar body 22 of a generally rectangular closed sectional shape, and a pillar support section 23 supporting the pillar body 22 on the vehicle body.

The pillar body 22 is an elongated member manufactured by forming a steel tube into a generally rectangular closed sectional shape through a hydroform process. The pillar body 22 integrally has: the front wall section 12 facing forward of the vehicle body; an outer side wall section 26 bent rearwardly (i.e., toward the rear of the vehicle body) from the outer side edge of the front wall section 12; an inner side wall section 27 bent rearwardly from the inner side edge of the front wall section 12; and a rear wall section 28 located adjacent to a vehicle compartment 36 and interconnecting the rear edges of the inner and outer side wall sections 27 and 26.

The front wall section 12 and the outer side wall section 26 of the pillar body 22 are located on the outer side of the vehicle body, and the rear wall section 28 and the inner side wall section 27 are located on the inner side of the vehicle body adjacent to the interior of the vehicle compartment 36.

The front wall section 12 lies substantially parallel to the front window glass 14 and is spaced rearwardly from the front window glass 14 by a predetermined distance or interval. Further, the lateral inner end 71a of a painted section 71 of the front window glass 14 and an exposed-section end 12a of the front wall section 12 are spaced from each other by a predetermined distance or interval S1 in the width direction of the vehicle body. The exposed-section end 12a is the left end (i.e., outer end in the vehicle body width direction) of a section, exposed to the front window glass 14, of the pillar body's front wall section 12.

The rear wall section 28 lies substantially parallel to the front wall section 12 and is spaced rearwardly from the front wall section 12 by a predetermined interval S2; this predetermined interval S2 will also be referred to as "side width S2". The rear wall section 28 has a smaller width than the front wall section 12 and has a mounting hole 31 formed therein centrally in the vehicle body width direction.

The inner side wall section 27 extends rearwardly from the inner side edge of the front wall section 12 to the inner side edge of the rear wall section 28 and in a direction substantially perpendicular to the front window glass 14. The outer side wall section 26 extends rearwardly from the outer side edge of the front wall section 12 to the outer side edge of the rear wall section 28 in such a manner that it gradually slants laterally inwardly toward the inner side wall section 27 or toward the interior of the vehicle compartment 36.

The pillar body 22 has a front width W1 and a rear width W2. The front width W1, rear width W2 and side width S2 are set to establish relationship of S2>W1>W2. Namely, because the pillar body 22 is manufactured by forming a steel tube into a generally rectangular closed sectional shape through a hydroform process as noted above, the front width W1 and rear width W2 can be readily reduced as compared to the side width S2.

The pillar support section 23 has an inner support plate portion 42 facing the vehicle compartment 36, a flange 41 extending outwardly from the inner support plate portion 42 near the rear edge of the outer side wall section 26, and an outer support plate portion 43 branching outwardly forward from the flange 41. Seal member 44 is attached to the flange 41.

The inner support plate portion 42 extends along, and is welded to, the rear wall section 28 of the pillar body 22 and has a bent-forward inner end portion 45 extending along the inner side wall section 27. The inner end portion 45 includes an engaging end portion 45a that is spaced laterally apart from the inner side wall section 27 by a predetermined interval S3.

The inner support plate portion 42 has a mounting hole 47 formed therein coaxially with the above-mentioned mounting hole 31 of the rear wall section 28. The outer support plate portion 43 extends along, and is welded to, the outer side wall section 26 of the pillar body 22. The mounting hole 31 of the rear wall section 28 and the mounting hole 47 of the inner support plate portion 42 are provided for mounting the pillar garnish 20 to the pillar body 22 in a manner to be described later.

The pillar garnish 20 is a decorative member (interior decorating member) for covering the inner side wall section 27 and rear wall section 28 (i.e., wall sections facing the vehicle compartment 36) of the left front pillar 11.

The left pillar garnish 20 integrally has: a rear wall section 51 disposed adjacent to the rear wall section 28 of the pillar body 22 and facing a vehicle occupant 33 seated in a seat (i.e., vehicle occupant's seat 30); a fixation section 52 provided on a portion of the rear wall section 51 disposed adjacent to the vehicle compartment and adapted to be fixedly mounted to a portion of the pillar body 22 facing the vehicle compartment 36; a side wall section 53 disposed inwardly of the inner side wall section 27 and extending forward from the rear wall section 51; and a swing preventing section 54 provided on the side wall section 53.

The left pillar garnish 20 has a generally J shape defined by the rear wall section 51 and the side wall section 53. The rear wall section 51 has a width W3, and the side wall section 53 has a dimension S4 greater than the width W3 (S4>W3).

As noted above, the front width W1, rear width W2 and side width S2 are set to establish the relationship of S2>W1>W2. Thus, the instant embodiment can considerably reduce the width W3 of the rear wall section 51 of the pillar garnish 20 disposed along the pillar body 22.

The rear wall section 51, facing the vehicle occupant 33 seated in the seat 30, has an outer half section 51b extending rearwardly from the outer end 51a while slanting toward the interior of the vehicle compartment 36, and an inner half section 51c extending from the inner edge of the outer half section 51b toward the vehicle compartment 36. The outer half section 51b and the inner half section 51c together define a dogleg-like sectional shape.

In the rear wall section 51, the fixation section 52 is formed integrally with a corner section 51d of the pillar garnish 20 which is opposed to the rear wall section 28 of the left front pillar 11. The fixation section 52 is projected from the corner section 51d forwardly toward the rear wall section 28 of the pillar 11, and has a mounting portion 57 opposed to the rear wall section 28. As shown in FIGS. 2-3, the mounting portion 57 of the fixation section 52 is disposed forward of a lateral outer (outward) end 51a of the rear wall section 51. An extension line 58, extending in a direction in which the fixation section 52 is projected, positionally coincides with the left end portion 15 of the front window glass 14 when the pillar garnish 20 is mounted on the pillar 11.

Further, as shown in FIG. 2, the section 51d opposed to the rear wall section 28 is disposed in such a manner that its rear end 51e is located at a front-side position on an outer-side extension line 63 that connects the rear end 44a of the seal member 44, rear end 38a of a door sash 38 and eye point 34 of the vehicle occupant 33 in the seat 30.

In the aforementioned manner, the fixation section 52 can be projected forwardly toward the front window glass 14; that is, it is possible to eliminate a need for projecting the fixation section 52 inward in the vehicle width direction. Thus, the instant embodiment can secure a sufficiently wide field of view of the vehicle occupant 33 seated in the seat (vehicle occupant's seat) 30.

The mounting portion 57 has a mounting hole 59 formed in its region located on the above-mentioned extension line 58. The mounting hole 59 is located coaxially with the aforementioned mounting holes 47 and 31 of the inner support plate portion 42 and rear wall section 28.

Clip 61 is provided on the extension line 58 with its head 62 engaged with the edge of the mounting hole 59. The clip 61 projects forward through the mounting holes 59, 47 and 31. With the clip 61 engaged with the edges of the mounting holes 47 and 31, the fixation section 52 is fixedly mounted to the rear wall section 28 (i.e., region of the left front pillar 11 facing the vehicle occupant 33 in the seat 30). Note that the clip 61 is of a conventional type commonly used, for example, as a fastener for fastening a garnish or the like to a vehicle body.

As seen from the foregoing, the fixation section 52 is projected in a direction along a line of sight 35 of the vehicle occupant 33 seated in the seat 30. Thus, the fixation section 52 need not be projected inward in the vehicle width direction, i.e. in the direction intersecting with the line of sight 35 of the vehicle occupant 33, so that the left pillar garnish 20 can be formed into a reduced width in a region thereof visible from the eye point 34 of the vehicle occupant 33 seated in the seat 30.

With the fixation section 52 projected toward the rear wall section 28 when the pillar garnish 20 is mounted on the pillar 11, inner and outer accommodating spaces 64 and 65 are defined in both sides, in the vehicle width direction, of the fixation section 52. Namely, the inner and outer accommodating spaces 64 and 65 can be provided behind the left front pillar 11.

Vehicular component part, such as a tension belt 67 of a side curtain airbag, is accommodated in the outer accommodating space 65, and another vehicular component part, such as a wire harness of an air conditioner, room lamp, etc., is accommodated in the inner accommodating space 64. The tension belt 67 supports the side curtain airbag in a deployed state by connecting the side curtain airbag to the left front pillar 11. With the vehicular component parts accommodated in the inner and outer accommodating spaces 64 and 65, the vehicular component parts can be reliably prevented from being displaced relative to the pillar 11.

As further shown in FIG. 3, the left pillar garnish 20 is disposed on a surface of the left front pillar 11 facing the vehicle compartment 36 with its side wall section 53 extending forward from the rear wall section 51 having the fixation section 52 integrally provided thereon. More specifically, the inner side surface 11a of the left front pillar 11 is covered with the side wall section 53 disposed adjacent to the vehicle compartment 36.

The inner side surface 11a of the left front pillar 11 is defined by the inner side wall section 27 and rear wall section 28 (i.e., region of the pillar garnish 20 facing the vehicle compartment 36). The side wall section 53 extends from the inner side edge of the rear wall section 51 forwardly toward the front wall section 12 while slightly slanting laterally outward, i.e. toward the inner side wall section 27.

Figure 4:
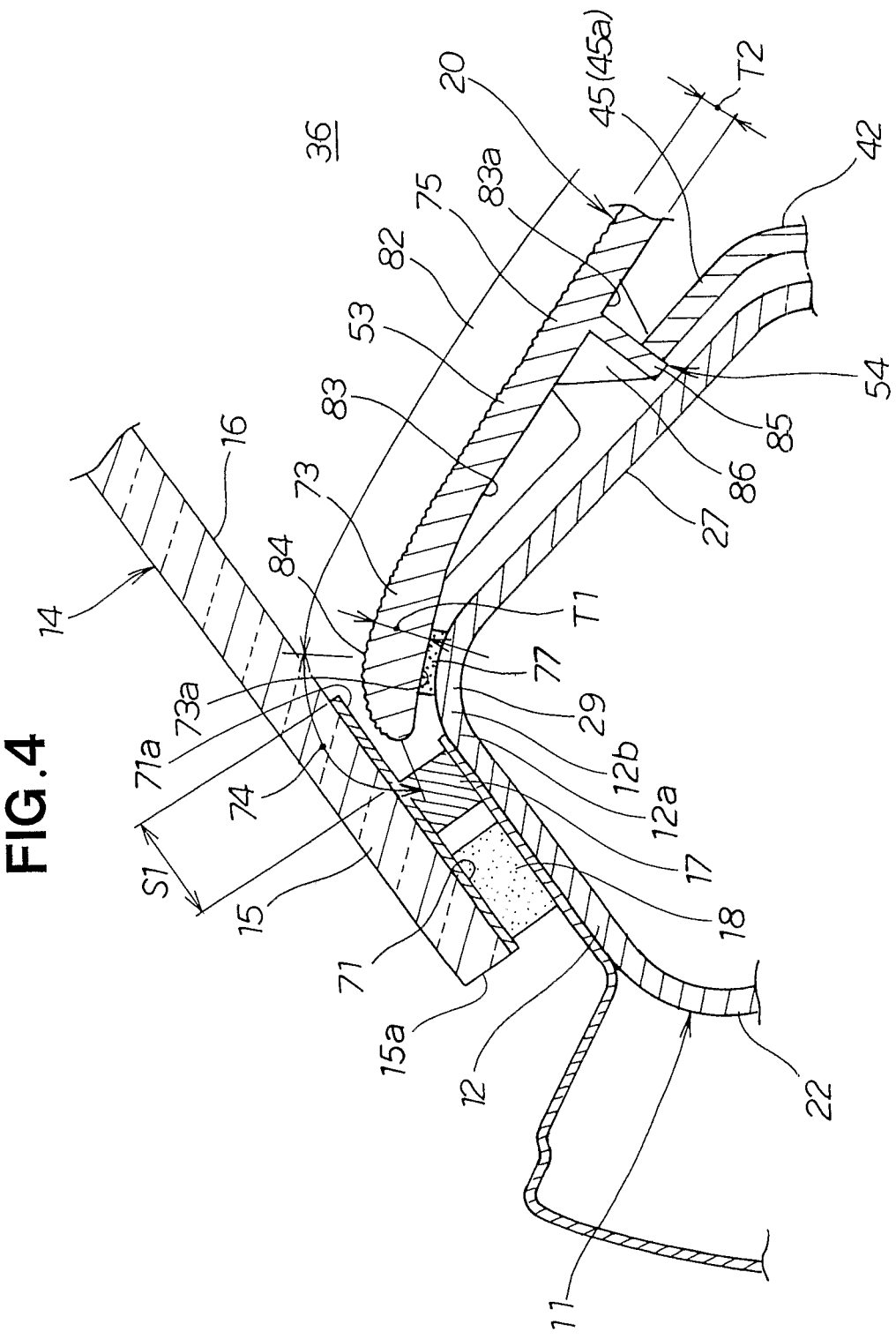
FIG. 4 is an enlarged view of an area encircled at 4 in FIG. 2.

FIG. 4 is an enlarged view of an area encircled at 4 in FIG. 2. When the pillar garnish 20 is mounted on the pillar 11, the side wall section 53 of the pillar garnish 20 has a front edge portion 74 located in the interval S1 between the inner end 71a of the painted section 71 of the front window glass 14 and the exposed-section end 12a of the front wall section 12. As also shown in FIG. 2, the front edge portion 74 is located in a space between the front window glass 14 and the pillar 11, so that it can achieve the function of preventing unwanted displacement of the pillar garnish 20 near the front edge portion 74 to thereby constitute a means for preventing unwanted swinging movement of the pillar garnish 20 in conjunction with the swing preventing section 54.

The painted section 71 (inner end 71a) is located to the left (i.e., laterally outward in the vehicle-body width direction) of an inner-side extension line 66 connecting the inner surface 53a of the side wall section 53 and the eye point 34 of the vehicle occupant 33 seated in the seat 30.

The painted section 71 is a section of the inner surface 16 (facing the vehicle compartment 36) of the left end portion 15 of the window glass 14 and painted, for example, in black color.

Further, a front end portion 73 of the side wall section 53 has a thickness T1 greater than a thickness T2 of the remaining portion 75 of the side wall section 53 and thus has a relatively great surface area. With the front end portion 73 having such a great surface area, a texturing process can be performed on the surface 82 of the side wall section 53 (more specifically the surface of the front end portion 73 and remaining portion 75) and on the front edge portion 74. Namely, the texturing process can be performed on the surface of the side wall section 53 from the front end portion 73 to the front edge portion 74 continuously and uniformly.

Through the texturing process performed on the surface of the side wall section 53 continuously and uniformly, the front end portion 73 and the front edge portion 74 of the side wall section 53 can be mirrored similarly on the front window glass 14, and a boundary line 84 between the front end portion 73 and the front edge portion 74 of the side wall section 53 can be made less visible.

The front end portion 73 of the side wall section 53 has an elastically deformable cushion member 77 provided on its surface 73a opposed to an intersecting portion 29 between the front wall section 12 and the inner side wall section 27 of the left front pillar 11. The cushion member 77 is held in abutment with the intersecting portion 29.

Referring back to FIG. 2, the front end portion 73 of the side wall section 53 is located to overlap the fixation section 52 in the front-rear direction of the vehicle when the pillar garnish 20 is mounted on the pillar 11. Thus, the pillar body 22 of a generally rectangular closed sectional shape is sandwiched between the front edge portion 74 of the side wall section 53 and the outer end 51a of the rear wall section 51, and the left front pillar 11 is accommodated in an area 81 between the front edge portion 74 and the outer end 51a. In this way, the left pillar garnish 20 can hide the left front pillar 11 from the line of sight 35 of the vehicle occupant 33, so that a widened field of view of the vehicle occupant 33 can be secured.

Further, the swing preventing section 54 is provided on the reverse surface of the side wall section 53 and projected toward the inner side wall section 27, and the swing preventing section 54 is located forwardly of the fixation section 52. The swing preventing section 54 engages with or abuts against the engaging portion 45a of the inner support plate portion 42 to prevent unwanted movement, in the front-rear direction, of the pillar garnish 20 relative to the pillar body 22 in conjunction with the clip 61.

The side wall section 53 of the left pillar garnish 20 is held in place, via the swing preventing section 54, adjacent to the inner side wall section 27 of the pillar body 22, and the rear wall section 51 of the left pillar garnish 20 is engaged with the rear wall section 28 of the pillar body 22 via the clip 61. In this way, the left pillar garnish 20 can be retained stably on the left front pillar 11 and readily appropriately positioned relative to other components therearound.

Further, the rear wall section 51 and side wall section 53 of the left pillar garnish 20 can be appropriately supported via the left front pillar 11, so that the left pillar garnish 20 can be retained on the left front pillar 11 in an even more stable manner.

Further, the front edge portion 74 of the side wall section 53 is located to overlap the fixation section 52 in the front-rear direction of the vehicle. Thus, the front edge portion 74 and the fixation section 52 can be located to sandwich therebetween the left front pillar 11 (particularly the pillar body 22 or closed-sectional-shape section of the pillar 11), and the left pillar garnish 20 can be retained on the left front pillar 11 even more stably.

With reference to FIGS. 2 and 3, the following describe a manner in which the instant embodiment can secure a widened field of view of the vehicle occupant 33 seated in the seat 30. As set forth above, the front edge portion 74 of the side wall section 53 is located to overlap the fixation section 52 in the front-rear direction of the vehicle, and the left front pillar 11 is accommodated in the area 81 between the front edge portion 74 and the outer end 51a of the rear wall section 51. In this way, the left pillar garnish 20 can hide the left front pillar 11 from the line of sight 35 of the vehicle occupant 33 seated in the seat 30.

Further, the front width W1 and rear width W2 of the pillar body 22 are set smaller than the side width S2, and the rear wall section 51 of the pillar garnish 20 has a reduce width W3. Furthermore, the fixation section 52 is projected forward from the rear wall section 51 of the pillar garnish 20 toward the rear wall section 28. Thus, the fixation section 52 can be projected in the direction along the line of sight 35 of the vehicle occupant 33, so that the fixation section 52 need not be projected in the direction intersecting with the line of sight 35 of the vehicle occupant 33.

By reducing the width W3 of the rear wall section 51 of the pillar garnish 20 and projecting the fixation section 52 in the direction along the line of sight 35, the left pillar garnish 20 can be formed into a reduced width in the region thereof visible from the eye point 34 and can thereby secure a widened field of view of the vehicle occupant 33.

In addition, with the fixation section 52 projected toward the rear wall section 28, the inner and outer accommodating spaces 64 and 65 are provided in both sides, in the vehicle width direction, of the fixation section 52; thus, the inner and outer accommodating spaces 64 and 65 can be provided behind the left front pillar 11. In this way, the width W3 of the rear wall section 51 of the pillar garnish 20 can be reduced even further, which can secure an even further widened field of view of the vehicle occupant 33 seated in the seat 30.

Furthermore, the front edge portion 74 of the side wall section 53 is located in the interval S1 between the inner end 71a of the painted section 71 of the front window glass 14 and the exposed-section end 12a of the front wall section 12. Thus, the painted section 71 can be provided with its inner end 71a located close to the left edge 15a of the front window glass 12 while preventing the front wall section 12 of the pillar body 22 from being exposed from between the front edge portion 74 of the side wall section 53 and the painted section 71 even when viewed from outside the vehicle. Consequently, the field of view of the vehicle occupant 33 seated in the seat 30 can be widened up to the painted section 71 of the front window glass 14.

Namely, with the painted section 71 disposed to the left (i.e., laterally outward in the vehicle-body width direction) of the inner-side extension line 66 and with the rear end 51e of the rear wall section 28 disposed at a front-side position of the outer-side extension line 63 as set forth above, the left pillar garnish 20 can be formed into a considerably reduced width. Thus, it is possible to reduce an intersecting angle θ between the inner-side extension line 66 (i.e., inner-side line of sight 35) and the outer-side extension line 63 (i.e., outer-side line of sight 35), so that a sufficiently wide field of view of the vehicle occupant 33 can be secured.

Whereas the preferred embodiment of the present invention has been described above in relation to the case where the fixation section 52 is fixed to the rear wall section 28 of the left front pillar 11 by means of the clip 61, the fixation section 52 may be fixed to the rear wall section 28 by means of a bolt, screw or the like rather than the clip 61.

Further, whereas the preferred embodiment of the present invention has been described above in relation to the case where the pillar garnish 10 of the present invention is applied to the front pillar 11, the present invention is not so limited, and the pillar garnish 10 may be applied to other pillars, such as a rear pillar.

INDUSTRIAL APPLICABILITY

The present invention is well suited for application to automotive vehicles where a surface of a pillar facing a vehicle compartment is to be covered to decorate the interior of the vehicle compartment.

The invention claimed is:

1. A vehicle pillar garnish for mounting on a vehicle pillar to cover a surface of the vehicle pillar facing a vehicle compartment, said vehicle pillar garnish comprising:
   a rear wall section for placement on a portion of the vehicle pillar facing toward a vehicle occupant's seat, said rear wall section comprising an outer section having a lateral outward end at a forward edge thereof, and an inner section;
   a fixation section integrally attached to and extending forwardly from a front surface of the rear wall section, the fixation section being adapted to be mounted to the portion of the pillar facing toward the vehicle occupant's seat and comprising a mounting portion disposed forward of the lateral outward end of said rear wall section; and
   a swing preventing section provided forwardly of the fixation section and engageable with a portion of the pillar for preventing the pillar garnish from swinging about the fixation section.

2. The vehicle pillar garnish of claim 1, further comprising:
   a side wall section extending from the rear wall section toward a front of the vehicle for covering an inner side surface of the pillar, the side wall section having the swing preventing section provided thereon.

3. The vehicle garnish structure of claim 2, wherein, when the pillar garnish is mounted on the pillar with the fixation section mounted to the portion of the pillar facing the vehicle occupant's seat, the side wall section is disposed in such a manner that a front edge portion thereof is located to overlap the fixation section in a front-rear direction of the vehicle to thereby constitute structure for preventing swinging movement of the pillar garnish in conjunction with the swing preventing section.

4. The vehicle garnish structure of claim 3, wherein the pillar is accommodated in an area between the front edge portion of the side wall section and the lateral outward end of the rear wall section, with at least part of a closed-sectional-shape section of the pillar sandwiched between the front edge portion of the side wall section and the lateral outward end of the rear wall section.

5. The vehicle garnish structure of claim 2, wherein, when the pillar garnish is mounted on the pillar with the fixation section mounted to the portion of the pillar facing the vehicle occupant's seat, the fixation section provided on the rear wall section is projected from the rear wall section toward the pillar, and an extension line extending in a direction where the fixation section is projected positionally coincides with an end portion, adjacent to the pillar, of a window glass supported by the pillar.

6. The vehicle garnish structure of claim 1, wherein, by the fixation section being projected forwardly from the rear wall section toward the pillar when the pillar garnish is mounted on the pillar, spaces capable of accommodating therein vehicular component parts are defined in both sides, in a vehicle width direction, of the fixation section.

7. The vehicle garnish structure according to claim 2, wherein a front end portion of the side wall section has a greater thickness than a remaining portion of the side wall section.

8. The vehicle garnish structure of claim 5, wherein the window glass has a painted section at the end portion adjacent to the pillar, and the side wall section has a front edge portion located between a lateral inner end, in a vehicle width direction, of the painted section and an exposed-section end of the pillar.

9. The vehicle garnish structure of claim 1, further comprising a clip operatively attached to the mounting portion of the fixation section and extending forwardly therefrom, said clip configured to retentively fit into a hole formed in a rear surface of the pillar.

10. The vehicle garnish structure of claim 2, further comprising an elastically deformable cushion member provided on a front end portion of the side wall for contacting a portion of the pillar proximate a window glass of the vehicle.

* * * * *